(12) United States Patent
Beberman

(10) Patent No.: US 11,729,001 B2
(45) Date of Patent: *Aug. 15, 2023

(54) DISTRIBUTED PROOF-OF-WORK FOR SHARDED OR PARALLEL BLOCKCHAINS

(71) Applicants: PRASAGA FOUNDATION, Dammstrasse (CH); David Alan Beberman, Holden, MA (US)

(72) Inventor: David Alan Beberman, Jefferson, MA (US)

(73) Assignees: PRASAGA FOUNDATION, Zug (CH); David Beberman, Jefferson, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/663,157

(22) Filed: May 12, 2022

(65) Prior Publication Data

US 2022/0271942 A1 Aug. 25, 2022

Related U.S. Application Data

(63) Continuation of application No. 16/579,245, filed on Sep. 23, 2019, now Pat. No. 11,362,832.

(60) Provisional application No. 62/830,428, filed on Apr. 6, 2019.

(51) Int. Cl.
*H04L 9/32* (2006.01)
*G06F 16/23* (2019.01)
*H04L 9/06* (2006.01)
*H04L 9/00* (2022.01)

(52) U.S. Cl.
CPC ........ *H04L 9/3242* (2013.01); *G06F 16/2315* (2019.01); *H04L 9/0637* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,320,569 B1 | 6/2019 | Wentz et al. | |
| 10,938,567 B2 | 3/2021 | Martino et al. | |
| 11,362,832 B2 * | 6/2022 | Beberman | H04L 9/3239 |
| 2019/0081793 A1 * | 3/2019 | Martino | H04L 9/0894 |
| 2019/0306190 A1 | 10/2019 | Suraparaju | |
| 2019/0312734 A1 | 10/2019 | Wentz et al. | |
| 2020/0026548 A1 | 1/2020 | Huang | |
| 2020/0153627 A1 | 5/2020 | Wentz | |
| 2020/0167512 A1 | 5/2020 | Chitra et al. | |

(Continued)

FOREIGN PATENT DOCUMENTS

WO WO-2022208312 A1 * 10/2022

OTHER PUBLICATIONS

Satoshi Nakamoto, "Bitcoin: A Peer-to-Peer Electronic Cash System", Jan. 2009 https://bitcoin.orgien/bitcoin-paper.

(Continued)

*Primary Examiner* — Kaveh Abrishamkar
(74) *Attorney, Agent, or Firm* — DLA Piper LLP US

(57) ABSTRACT

A computer-based method for combining individual hashpower of a plethora of shards that use a proof-of-work hash procedure such that each shard benefits from the hashpower from all other shards in the plethora of shards whereby a chosen set of shards having a maximal combined individual hashpower is a consensus.

20 Claims, 14 Drawing Sheets

(56) References Cited

U.S. PATENT DOCUMENTS

2020/0250747 A1    8/2020  Padmanabhan
2020/0285634 A1    9/2020  Jho
2020/0322162 A1*  10/2020  Beberman ............. H04L 9/0637

OTHER PUBLICATIONS

Internet Engineering Task Force, "US Secure Hash Algorithms", RFC 6234, https://tools_ieff.org/html/rfc6234.
Tiaan Wolmarans, "Sharding and Scaling on Blockchain", "Hackemoon", Aug. 29, 2019, https://www.hiackemoon.comisharding-and-the-scaling-of-a-blockchain-xzl kq30j0.
Tiaan Wolmarans, "Sharding and the scaling of a blockchain (Part II)", "Hackemoon", Sep. 9, 2019, https://www. hiackemoon. comisharding-and-the-scal ing-of-a-blockchain-i i-e88v31bv.
Ken Huang, Xiang Wenbo, "Why It is Impossible to Solve Blockchain Trilemma", 8BTC, Feb. 26, 2019, https:// news.8btc_com/why it is impossible-to-solve-blockchain-trilemma.
Shaan Ray, "What is Proof of Stake'?", Hackemoon, Oct. 6, 2017, https://hackernoon_com/what-is-proof-of-stake-8e0433018256.
Zehui Xiong, Shaohan Feng, Wenbo Wang, Dusit Niyato, Ping Wang and Zhu Han, "Cloud/Fog Computing Resource Management and Pricing for Blockchain Networks," IEEE Internet of Things Journal, vol. 6, Issue 3, pp. 4585-4600, Sep. 24, 2018. Year: 2018).

* cited by examiner

FIG. 10 – list of disjoint sets

DISTRIBUTED PROOF-OF-WORK FOR SHARDED OR PARALLEL BLOCKCHAINS

CROSS REFERENCE TO RELATED APPLICATIONS

This application is a Continuation of U.S. patent application Ser. No. 16/579,245 filed Sep. 23, 2019, which claims the benefit of priority of U.S. Provisional Application No. 62/830,428, filed Apr. 6, 2019. The content of both of which are incorporated herein by reference in their entireties.

The present disclosure relates to the fields of blockchain consensus algorithms, in particular Proof-of-Work consensus, and the trilemma: scalability; security; and decentralization. The trilemma states that increasing any two of the three will cause a reduction in the third parameter. The present disclosure addresses the trilemma by increasing scalability and decentralization while avoiding a decrease in security.

NON-LIMITING DEFINITIONS

Blockchain a distributed replicated database that keeps a continuously growing list of data records. Each data record is protected against tampering and revisions. Blockchains are used with public ledgers of transactions, where each data record is protected cryptographically.

Proof-of-Work Hash a hash value generated by a secure hash function from at least the following values: a nonce; a previous hash value; and zero or more new data.

PoW

PoW Hash an abbreviation for Proof-of-Work hash

PoW Difficulty a threshold value for comparison to a PoW. A lower threshold value increases the difficulty of finding a PoW below the threshold.

PoW Consensus a consensus on a unique blockchain given a plethora of blocks, which may include conflicts, such that the unique blockchain is the longest chain with the highest degree of difficulty in finding PoWs.

PoS Consensus a consensus on a unique blockchain given a plethora of blocks, such that the choice of each block in the chain is determined via various combinations of random selection and wealth or age (i.e., the stake). PoS consensus includes some form of signature verification for each block.

Shard is a unique segment of blocks forming a unique segment of a blockchain. Equivalent terms are parallel blockchain, sharded blockchain, blockchain shard, directed acyclic graph shard. The terms are used interchangeably within the present disclosure.

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

Computing Node

Blockchain Node

Node

The terms "computing node", "blockchain node", or "node" are used to mean a computational device with an internal address that can host a copy of one or more shards and associated transactions.

BACKGROUND

The present disclosure creates long term security for consensus of a plethora of blockchains, also equivalently termed shards or parallel blockchains. One definition for long term security is that a new node joining a shard, with no prior stored history of shards, upon receiving a complete historical list of blocks of shards from one or more currently operating nodes, using an evaluation procedure, can determine the integrity of all shards within the probability bounds of a security mechanism used to secure the blockchains. Long term security is maintained if, when an adversary wishes to mount an attack by forking one or more shards to corrupt one or more blocks, then the expenditure of resources by the attack is beyond the potential gain for the adversary. The adversary's gain may be defined to be monetary, political or other. That is, the adversary may be motivated to expend the resources to perform an attack, where the gain to the adversary may be measured other than monetarily.

As discussed in the prior art material, (i.e. SATOSHI NAKAMOTO, "Bitcoin: A Peer-to-Peer Electronic Cash System", January 2009 and SHAAN RAY, "What is Proof of Stake?", Oct. 6, 2017), trust in a blockchain's consensus is based either on solving a difficult math puzzle, known as proof-of-work ("PoW") hash, or by some form of verification cryptographic signatures, known as proof-of-stake ("PoS") and various other names. As further discussed, in a sharding architecture, (TIAAN WOLMARANS, "Sharding and Scaling on Blockchain", Hackernoon, Aug. 29, 2019), the PoW security is diluted by the division of computing resources among the shards. This reduces the expenditure needed by an adversary for attacking any individual shard to greater than ½ of the compute hashpower soley of the individual shard as opposed to the total hashpower of the system. One of the methods for improving throughput of transactions on blockchains is the use of sharding to enable parallel computing. Since the dilution of hashpower for PoW accompanies such sharding, a solution that enables sharding with PoW that does not dilute the hashpower, and thus avoiding creating an attack surface, has been sought after.

Also, as further discussed, signature based consensus algorithms, although independent of compute resource expenditure attack, replace such an attack with a signature key stealing attack surface. It is assumed that attacking a currently running node to steal its signature key is intractable, but as nodes are taken offline and decommissioned, such signature keys may be recovered by an adversary at a later date due to loss of control of the node computing equipment. If sufficient keys are recovered to enable an adversary to fork a chain at any point in the previous history of a blockchain, a new history for the blockchain can be created that appears completely valid using the acquired signature keys, creating a false history. Given two or more conflicting histories of a blockchain, a new node evaluating the blockchain would have no means to determine which history is valid. Further, because the computational resource expenditure needed to create new blocks is negligible with a signature based consensus, an adversary can continually create any number of conflicting histories once the keys have been compromised.

One solution for protection from a long term attack for PoS is that any currently running blockchain node shall ignore any received block that is older in historical terms of the length of the blockchain by some given amount. For example, a block received by a node that is greater than M blocks previous to the current head block number N, such that N−M>X, where X is a design parameter, is ignored by the node.

This solution implicitly assumes that either a majority or supermajority of node keys are owned by honest nodes such that an adversary's blockchain's node keys are ignored. This assumption may not be valid since the computational power needed to generate a virtually unlimited number of dishonest node keys and masquerade of the number of nodes is negligible. Further, because the staking of nodes is based on transactions, and the adversary's blockchain can contain arbitrary transactions, then once a set of keys are compromised historically, staking as a protection mechanism against long term attacks is compromised.

In summary: an adversary attack against a PoW hash secured blockchain requires some form of 50%+ attack where sharding lessens the 50%+ attack threshold by the dilution of hashpower among the shards; while an adversary attack against a PoS secured blockchain requires the protection of the blockchain node signature keys for long term attacks because an adversary's dishonest blockchain does not require either significant computational power, or significant monetary cost, only some form of external compromise of decommissioned signature keys.

Protection against a short term attack may be mitigated by a variety of solutions of which a PoS secured blockchain is an example, and is not part of the present disclosure. What is needed is a means for scaling a blockchain by sharding the blockchain enabling parallel execution of the shards, while maintaining security level against long term attacks by adversaries at least as high as that of a single blockchain utilizing the combined hashpower of all of the blockchain nodes.

OBJECTS

Some of the objects of the present disclosure, which at least one embodiment herein satisfies, are as follows:

It is an object of the present disclosure to ameliorate one or more problems of the prior art or to at least provide a useful alternative;

Another object of the present disclosure is to provide a computer implemented system and method for realizing a distributed proof-of-work protocol which enables scaling of blockchain throughput using a sharded architecture without decreasing security or decentralization of the blockchain.

Other objects and advantages of the present disclosure will be more apparent from the following description, which is not intended to limit the scope of the present disclosure.

SUMMARY OF THE INVENTION

The present disclosure protects against long term attacks on sharded blockchains by combining the PoW hashpower of the individual shards. Combining the hashpower of all the shards forces an adversary wishing to mount an attack to overcome 50%+ of the total hashpower as opposed to the hashpower of a single shard. Accomplishing this creates an equivalent level of security as that of a single blockchain with all of the hashpower concentrated on the single blockchain, while enabling parallel execution of transactions on the shards, realizing increased scale of throughput through parallelization of transaction execution as compared to a single blockchain.

The method to combine the hashpower of all the individual shards has the following prerequisites:

The rate of block production for each shard is a known quantity, and may vary from shard to shard;

PoW for each shard of a blockchain is produced periodically and independently;

The value of the PoW difficulty for each shard is known, and may vary from shard to shard.

The hashpower available on each shard or blockchain is derived by:

$$\text{hashpower} = \text{Block production rate}/\text{PoW difficulty} \quad (1)$$

where a smaller PoW difficulty value implies a larger expenditure of compute resources to find a PoW solution, and vice-versa;

and where block production rate is defined in common units across all shards (e.g. seconds).

The combined hashpower of all the shards is the sum of the individual hashpowers:

$$\text{combined hashpower} = \Sigma(\text{Block production rate}/\text{PoW difficulty}) \quad (2)$$

summed over the shards.

The present disclosure describes a method to capture the combined hashpower of a set of shards and further, given a history of blocks from the shards, to evaluate the validity of the shards with respect to the combined hashpower. This method is termed Distributed Proof-of-Work ("D-POW") throughout the present disclosure, and has two protocol phases; a capture phase; and an evaluation phase.

An overview of the capture phase comprises:

each shard creating a PoW hash for a block;

periodically a PoW hash from a block from each shard is shared with all other shards;

the list of shared PoW hashes are then included in subsequent blocks in each shard.

An overview of the evaluation phase comprises:

searching and filtering the blocks containing the PoWs, at a later time subsequent to the capture phase, such that there are consistent PoW values among all the shards;

determining a maximal list of shards with consistent PoW values and maximal combined hashpower.

The combined hashpower security is established because an adversary attacking a shard would have to change the PoW for the attacked shard in every other shard. Since each of these shards are protected by their own PoWs, the adversary must overcome the combined hashpower of all the shard in the maximal list of shards.

The details of one or more implementations of the subject matter of this specification disclosure are set forth in the accompanying drawing and later descriptions. Other features, aspects and advantages of the subject matter will become apparent from the descriptions, the drawings and the claims.

DETAILED DESCRIPTION OF DRAWINGS

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

FIG. 1-8 are drawings depicting the distribution and collection phase of the D-PoW protocol.

Figure 1:
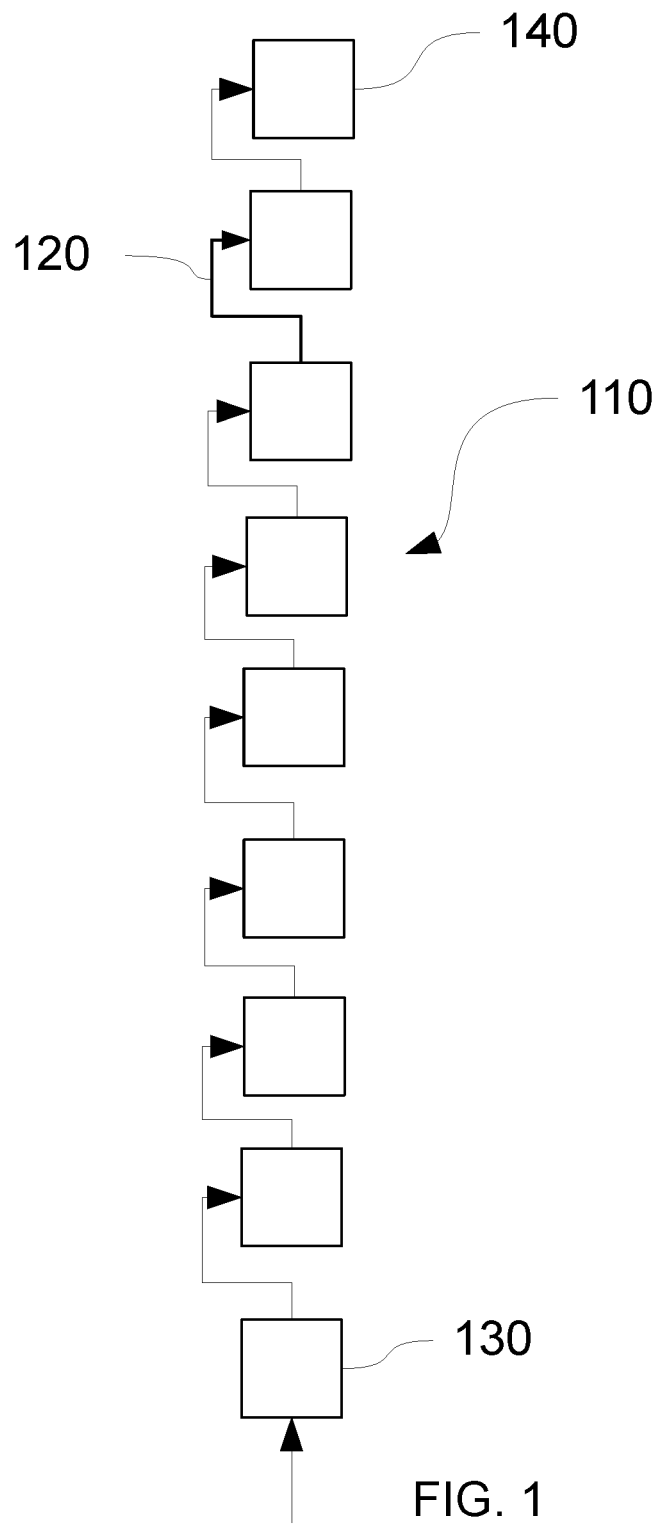
FIG. 1 is a drawing of a blockchain, where the links imply proof-of-work ("PoW") chaining.

FIG. 1 is a drawing depicting a single blockchain. A list of blocks 110 are ordered by block ID creating a linked list 120 from head 130 to tail 140. Each block includes a value from the previous block and generates a new value derived from the previous value and new data. This generates values using a low-collision probability algorithm such as a SHA 256.

Figure 2:
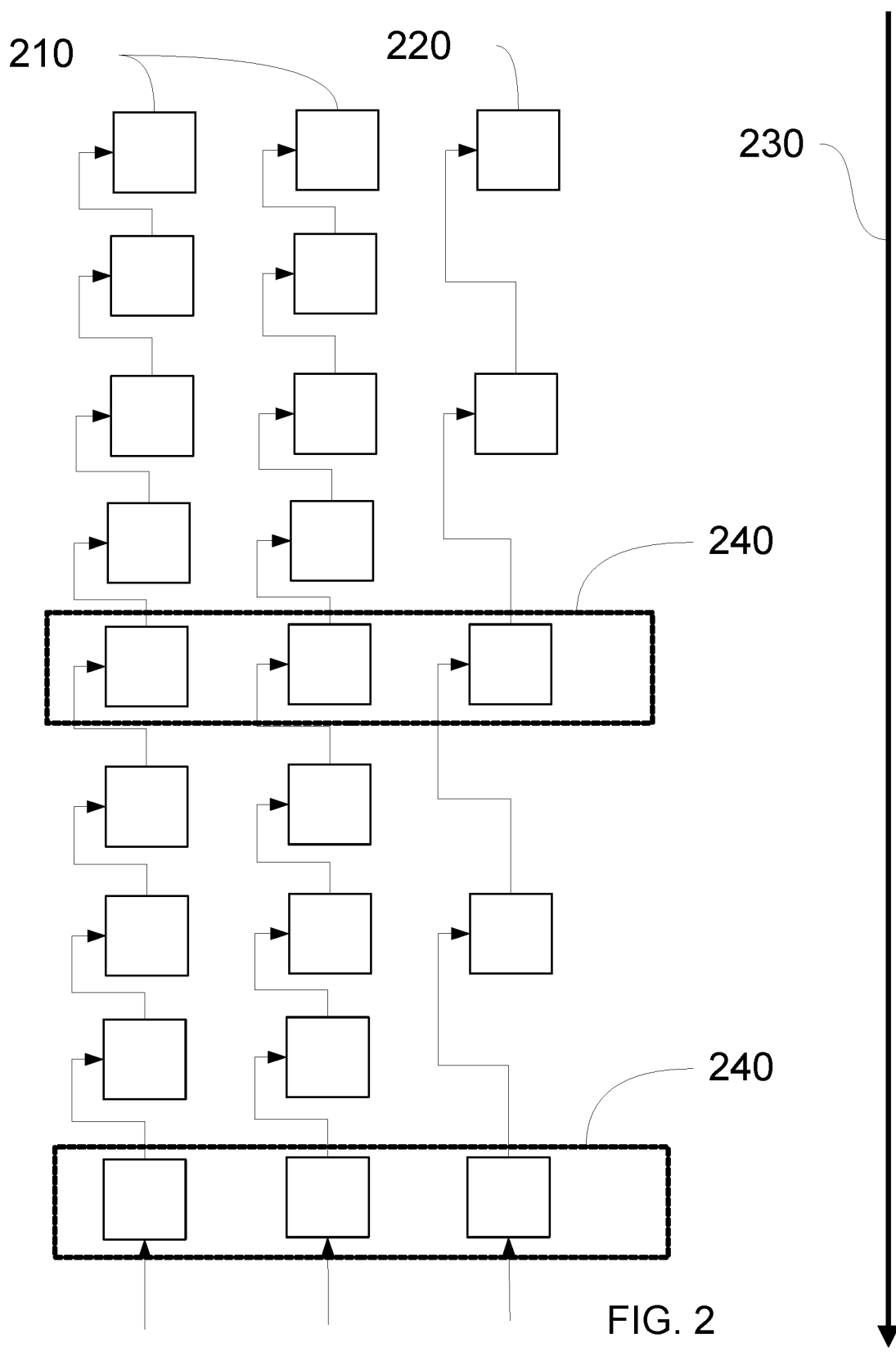
FIG. 2 is a drawing of multiple shards of varying block production rates, and periodic distributed PoW ("D-PoW") blocks.

FIG. 2 is a drawing depicting multiple blockchains in parallel. Two blockchains 210 produce blocks at the same rate, while a third blockchain 220 produces at a slower rate.

A time arrow 230 depicts passage of recorded time. Blocks which include D-PoW entries 240 occur periodically in all blockchains in parallel.

Figure 3:
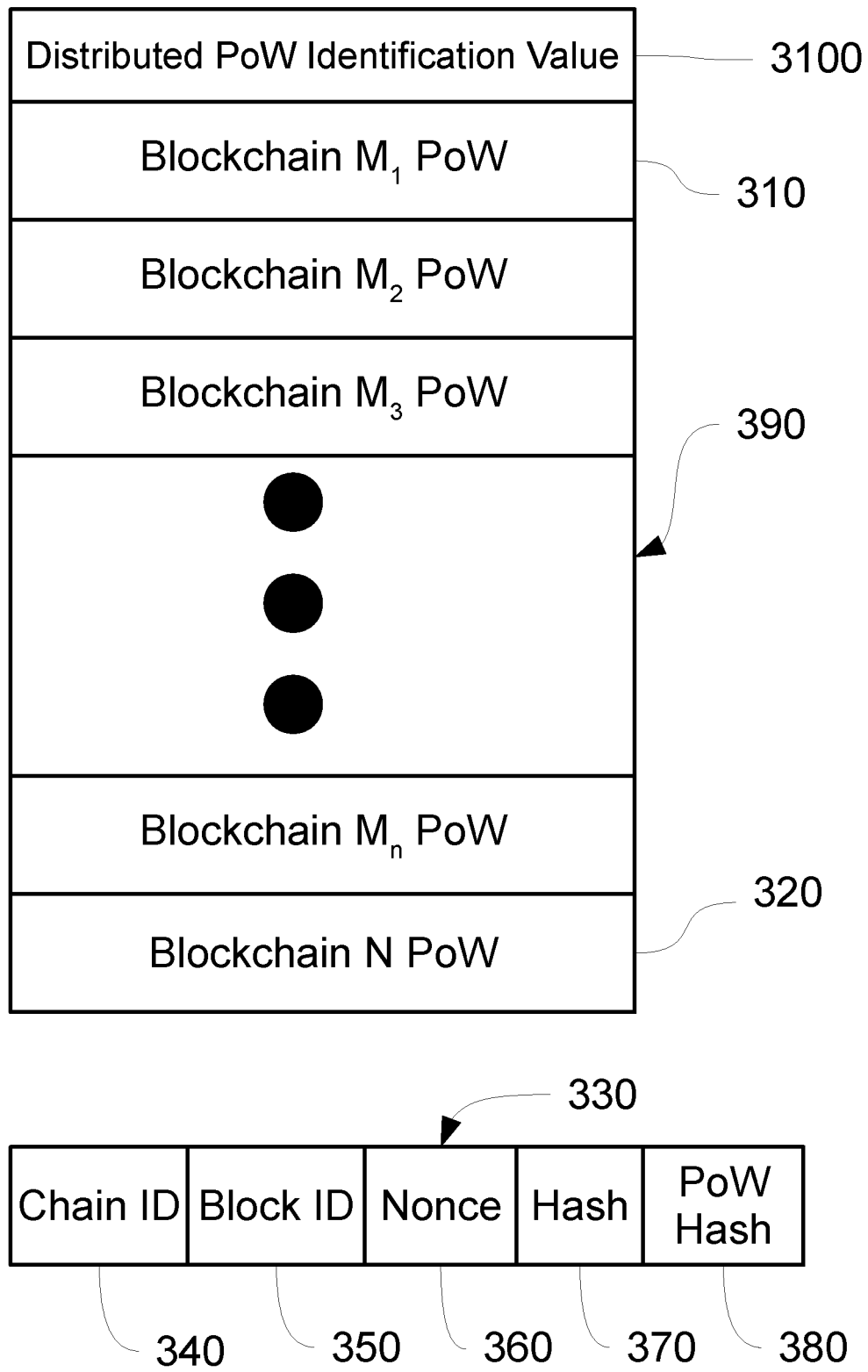
FIG. 3 is a drawing of a D-PoW protocol packet and a detailed D-PoW entry.

FIG. 3 is a drawing depicting a D-PoW entry 330 and a list of distributed PoW entries comprising a protocol packet 390 collected during the distributed PoW protocol distribution and collection phase. A distributed PoW entry 330 comprises a blockchain ID 340, a block ID 350, a nonce for the block ID 360, a hash of the block specified by block ID 370, and a PoW hash of the nonce and the block hash 370. On receiving a distributed PoW protocol packet 390 comprising: an identifier for the current instance of the D-PoW protocol 3100; and a list of distribute PoW entries 310, a blockchain node adds a distributed PoW entry 320 for one or more blockchains it has knowledge of, which are not in a previously received D-PoW protocol packet matching the D-PoW identifier 3100.

Figure 4:
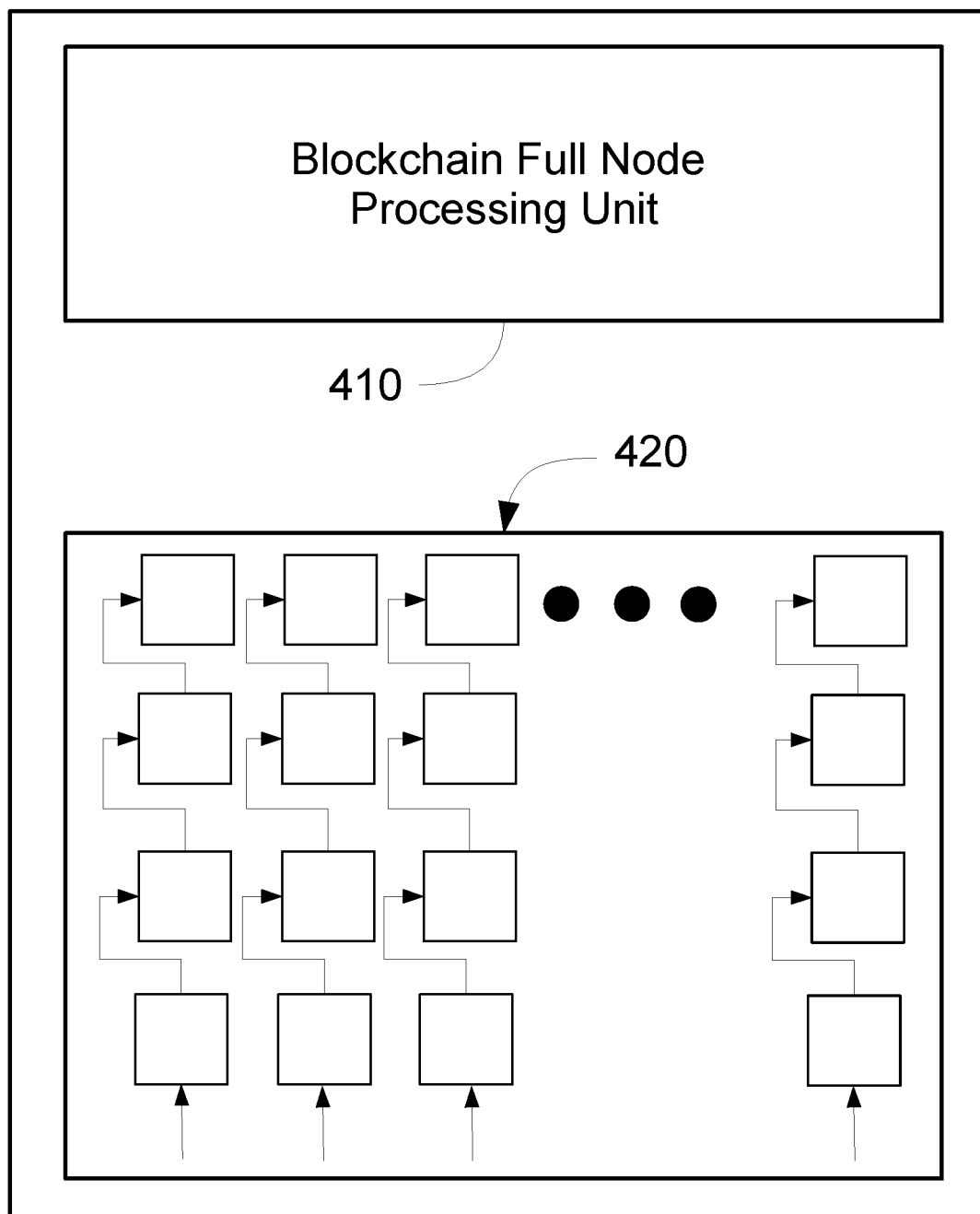
FIG. 4 is a drawing of a blockchain full node processing unit and a complete list of all shards.

FIG. 4 is a drawing depicting a blockchain full node processing unit 410 which has knowledge of all blockchains 420. A blockchain node may be either a full node or a sharded node. During a D-PoW distribution and collection phase, a full node processing unit 410 adds all shard PoWs to a D-PoW protocol packet 390.

Figure 5:
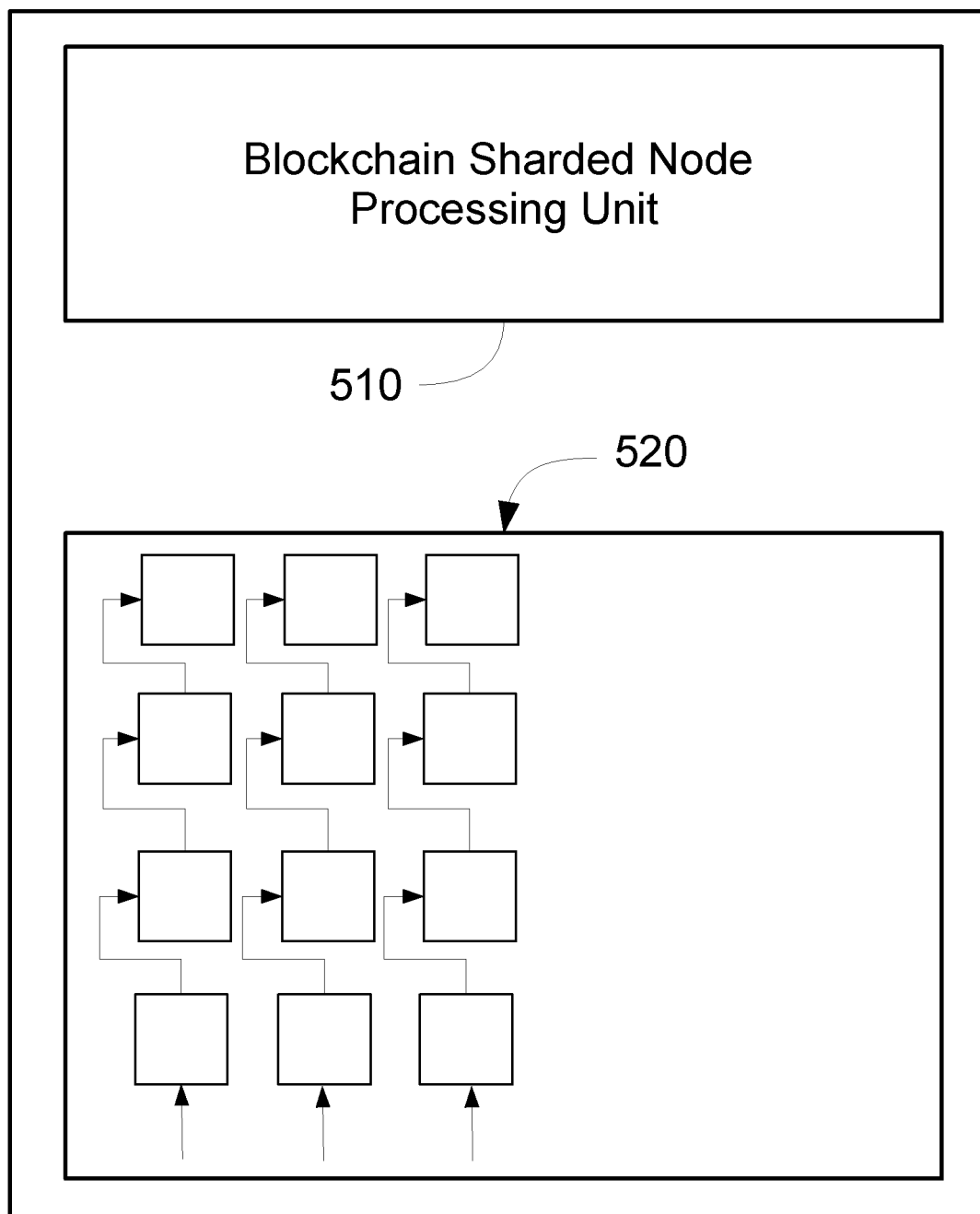
FIG. 5 is a drawing of a blockchain sharded node processing unit and a partial list of shards that the node is maintaining.

FIG. 5 is a drawing depicting a blockchain sharded node processing unit 510 which has knowledge of a subset of shards 520. A blockchain may be either a full node or a sharded node. During a D-PoW distribution and collection phase, a sharded node processing unit 510 adds the PoWs of the subset of shards that it has knowledge of to a D-PoW protocol packet 390.

Figure 6:
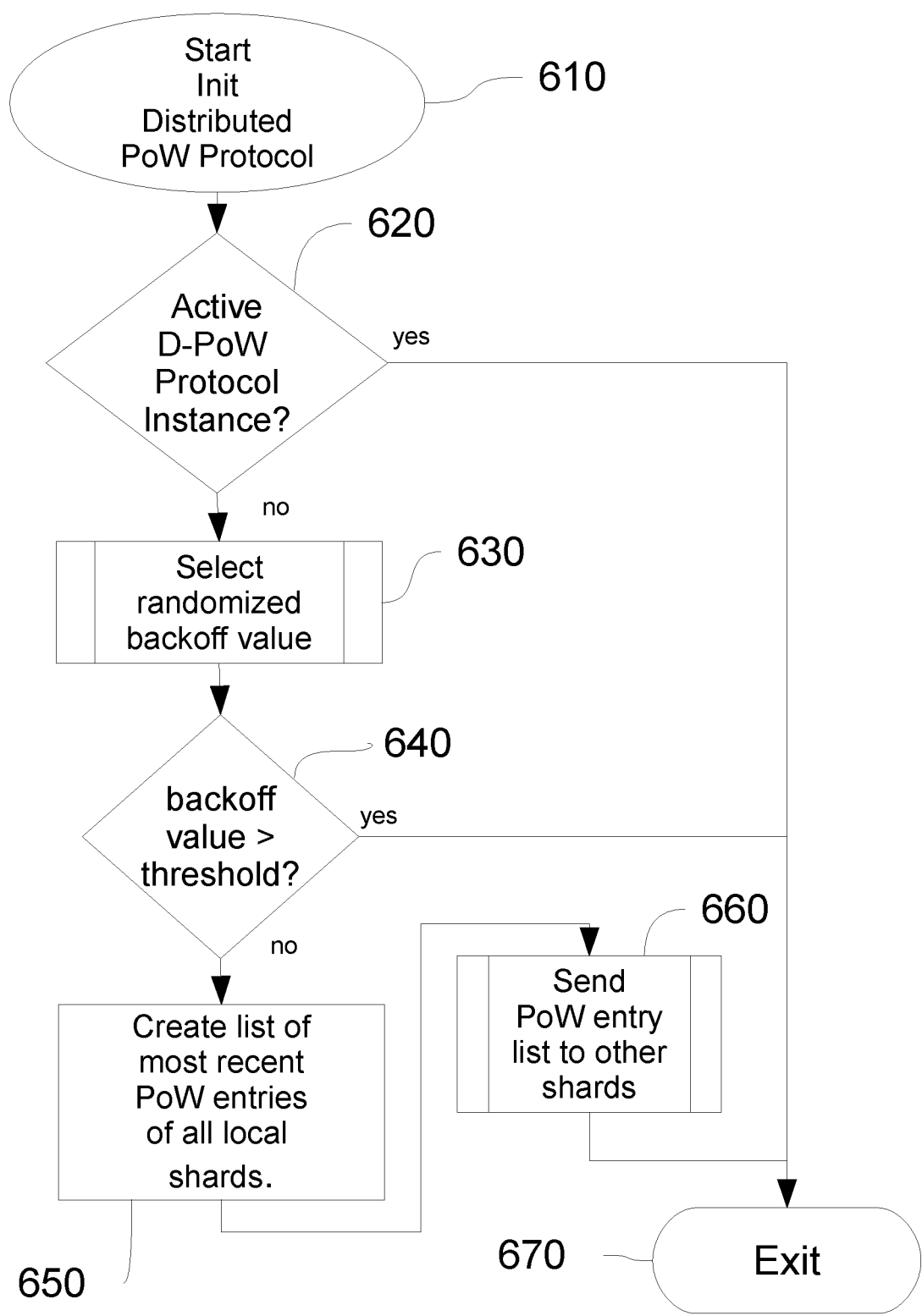
FIG. 6 is a drawing of a flowgraph for an instance of a D-PoW protocol initialization.

FIG. 6 is a drawing of a flowgraph for starting a D-PoW protocol instance at a node. Processing starts at 610 and proceeds to the decision point 620 where if a D-PoW protocol instance is currently active, the flowgraph exits immediately at 670. Otherwise processing continues to select a random value 630 from a range of values as a congestion backoff value and a threshold test at 640 is used to proceed to exit 670 if above the threshold. Otherwise processing continues to create a list of all locally known blockchain shard recent PoW values 650, and a D-PoW protocol packet is created with the list, and forwarded to other shards 690, and processing exits 670.

Figure 7:
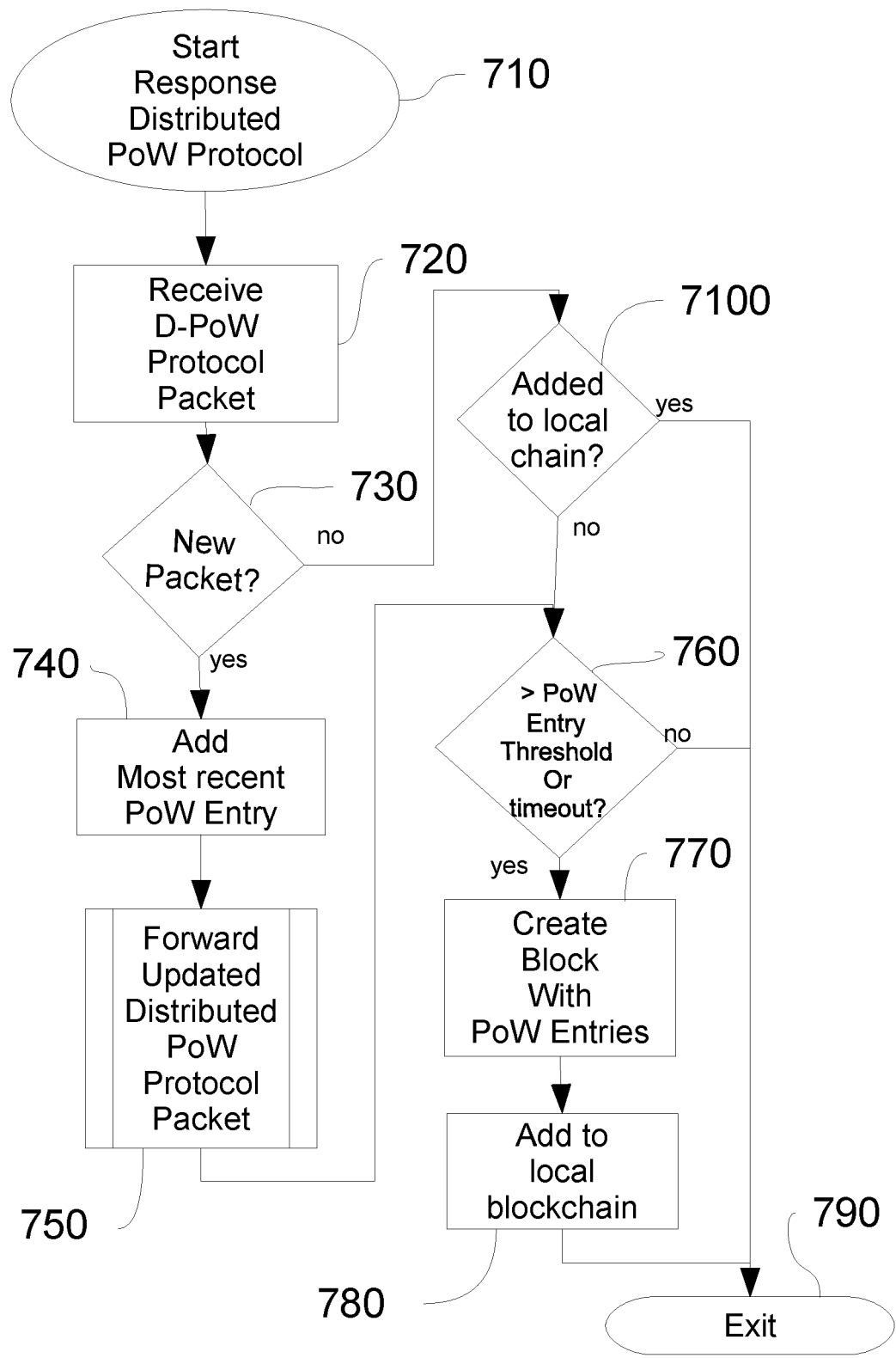
FIG. 7 is a drawing of a flowgraph for an instance of a D-PoW protocol operation.

FIG. 7 is a drawing of a flowgraph for receiving a D-PoW protocol packet 390. Processing starts at 610 and proceeds to receiving a D-PoW protocol packet 720. Decision 730 determines if the node has already received the D-PoW protocol packet previously. If the D-PoW protocol packet has been received previously, then:

decision 7100 determines if the list of D-PoWs collected in the D-PoW protocol packet have been added to the node's local shard. Processing exits 790 if decision is yes, otherwise:

decision 760 determines if the count of the list of PoW entries 330 contained in D-PoW protocol packet 390 is greater than an a priori determined global to all shards or parallel blockchain threshold value or a local D-PoW protocol timeout value has expired. Processing exits 790 if the decision is no, otherwise:

the local node adds the collected D-PoW entries to a subsequent block 770, and adds the block to the local shard 780, and exits 790.

otherwise:

the local node adds a PoW for a recent block to the D-PoW protocol packet 740, and forwards the D-PoW protocol packet to other shards 750. Processing continues at decision 760 as above.

Figure 8:
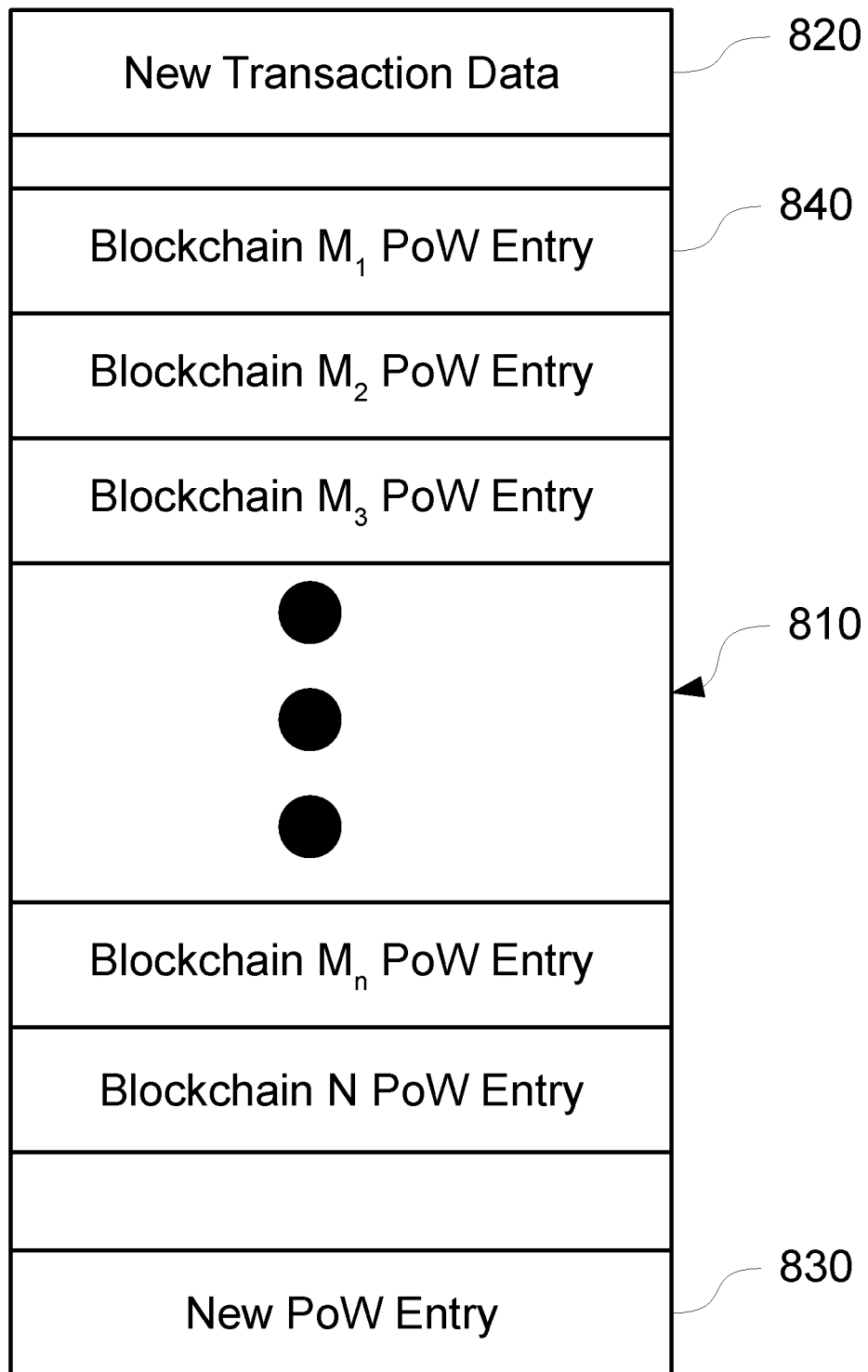
FIG. 8 is a drawing of a block containing D-PoW entries resulting from a D-POW protocol, a new PoW entry from the local blockchain, and new transaction data.

FIG. 8 is a drawing of a block 810 on a shard containing a list of collected PoWs from a D-PoW protocol execution. The block comprises: new transaction data 820; the list of collected PoWs 840; and a new PoW 830 for the block.

Figure 9:
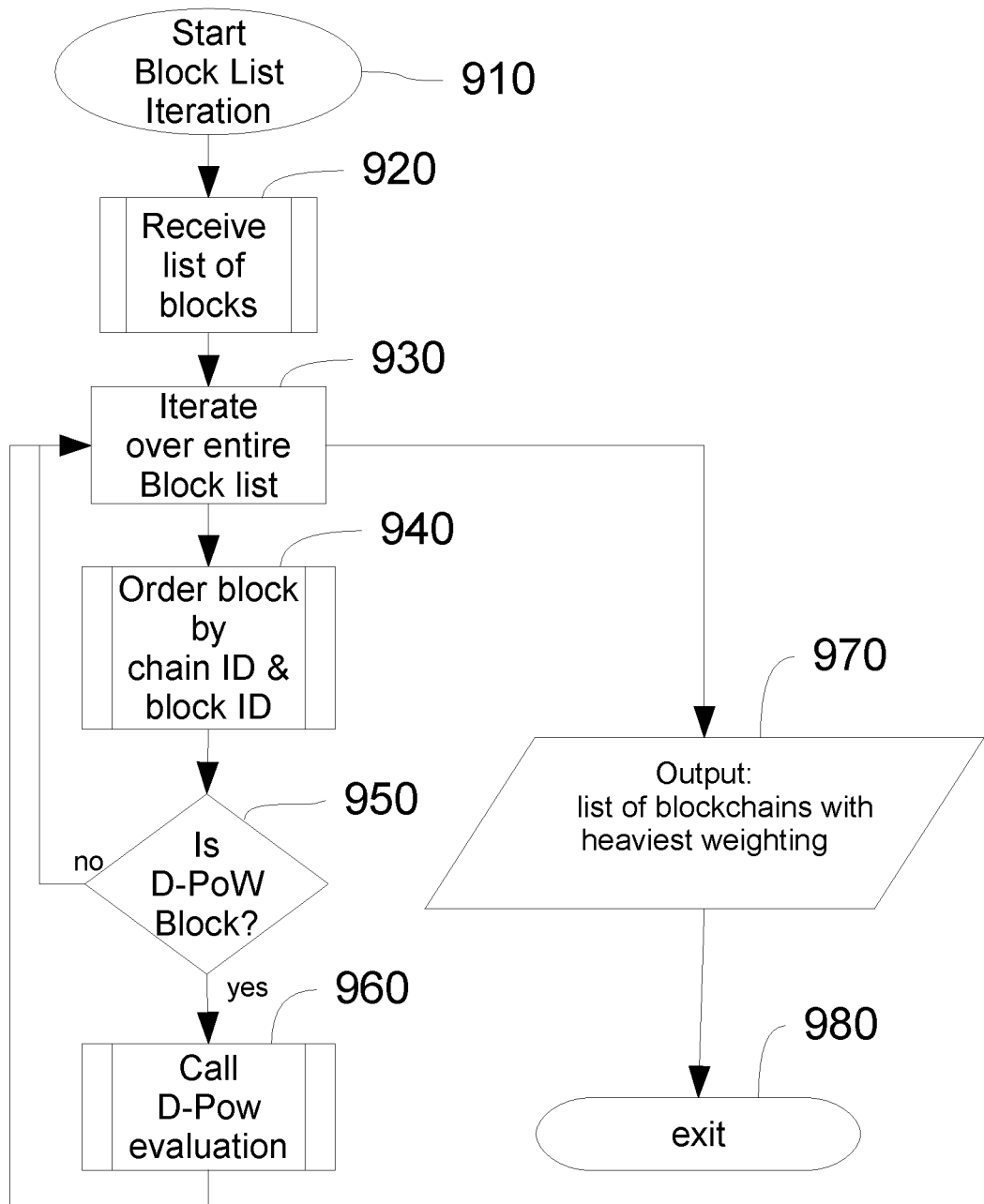
FIG. 9 is a drawing of a flowgraph for traversing a complete database of blocks for all shards.
Figure 10:
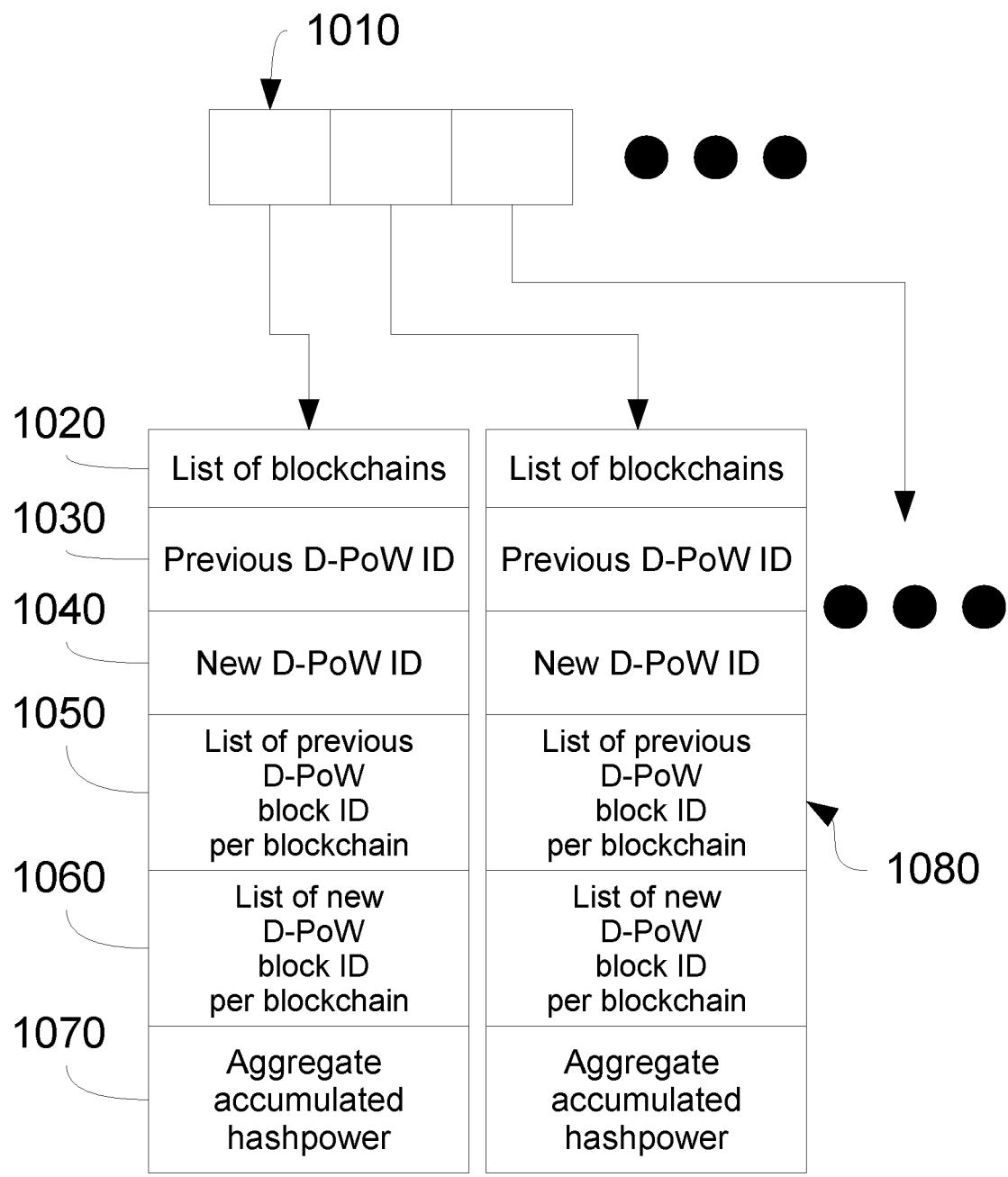
FIG. 10 is a drawing of a list of datastructures for evaluating the D-PoW blocks and resulting heaviest weighted disjoint set of shards.
Figure 11:
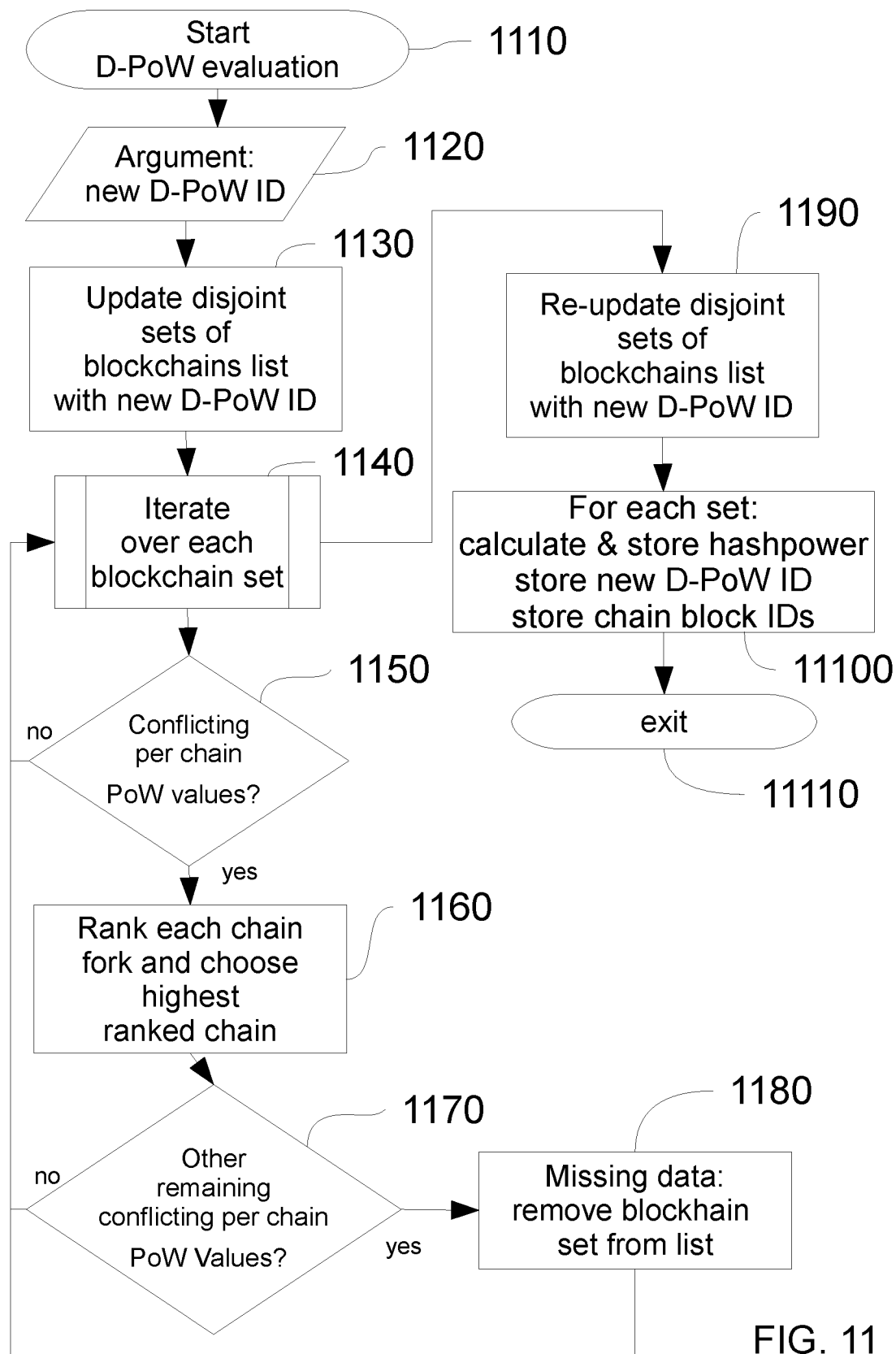
FIG. 11 is a drawing of a flowgraph for the D-PoW evaluation for each traversed D-PoW block.

FIG. 9-11 are drawings depicting the evaluation phase of the D-PoW protocol.

FIG. 9 is a drawing of a flowgraph to traverse a list of blocks from all shards. Processing starts at 910 and proceeds to receiving the list of blocks 920 either by downloading from one or more nodes, by reading from a local copy of the list, or by other means. The entire list of blocks is iterated over 930, where each block is ordered by shard ID and ordered by block ID within each shard 940. Decision 950 determines if the block contains a list of D-PoWs, and if yes proceeds to call the D-PoW evaluation procedure 960. On completion of iterating the list of blocks, output data comprises a list of shards or blockchains that have the highest weighting 970 as a result of the evaluation procedure FIG. 11. Processing exits at 980.

FIG. 10 is a drawing of datastructures used by the list of blocks traversal FIG. 9 and the evaluation procedure FIG. 11. The list 1010 contains entries 1080 which comprise: a list of shards or blockchain IDs 1020; a Previous D-PoW ID 1030, a new D-PoW ID 1040, a list of the block ID for each shard containing the PoW list for the previous PoW ID 1050; a list of the block ID for each shard containing the PoW list for the new PoW ID 1060; and the aggregate accumulated hashpower of all the blocks containing PoW lists for all of the shards in the list 1070. Where the values of each entry 1080 are generated from the evaluation procedure FIG. 11 called by the iteration procedure FIG. 9.

FIG. 11 is a drawing of a flowgraph to evaluate each block containing a list of PoWs resulting from a D-PoW distribution and collection protocol phase. Processing starts at 1110 and proceeds to receive a D-PoW ID 1120 of the block containing a list of PoWs. The list of sets of disjoint shards FIG. 10 are updated 1130 taking in to account the list of PoWs in the new D-PoW block, such that the list contains the largest possible disjoint sets of shards. Each disjoint set of shards is iterated over 1140, searching for conflicting PoW values for the same shard identified by chain ID FIG. 3-340 and block ID FIG. 3-350. The conflict decision 1150 proceeds to ranking the conflicting PoW values by the quantity of replications of the conflicting PoW values among the remaining shards in the disjoint set. The block with the highest rank PoW value is chosen 1160, and may include multiple blocks if there are equal rankings among multiple blocks. If there are other remaining conflicting PoW values, decision 1170 continues processing and any shards with a conflicting PoW are removed from the disjoint set of shards 1180. Any remaining conflicts at 1180 are due to missing or corrupt blocks such that the shard in conflict cannot be verified using the D-PoW protocol evaluation phase. On completion of iteration the list of sets of disjoint shards are updated 1190 in the same manner as 1130 to capture any changes in largest disjoint sets that may have occurred during the iteration over the disjoint sets of shards. Updating continues at 11100 with each disjoint set, the cumulative hashpower is updated by adding the hashpower associated with the PoW for each shard. The hashpower for each PoW is determined by the formula (2) given in the summary above. The new D-PoW ID is stored in the Previous D-PoW ID field 1030 for each disjoint set in the list 1010. The list of new D-PoW block IDs for each shard in each disjoint set 1060 is assigned to the list of previous D-PoW block IDs for each shard in each disjoint set 1050. The new list of D-PoW block IDs for each shard in each disjoint set 1050 is updated with a new list of block Ids corresponding to the new D-PoW ID. Processing exits at 11110.

Figure 12:
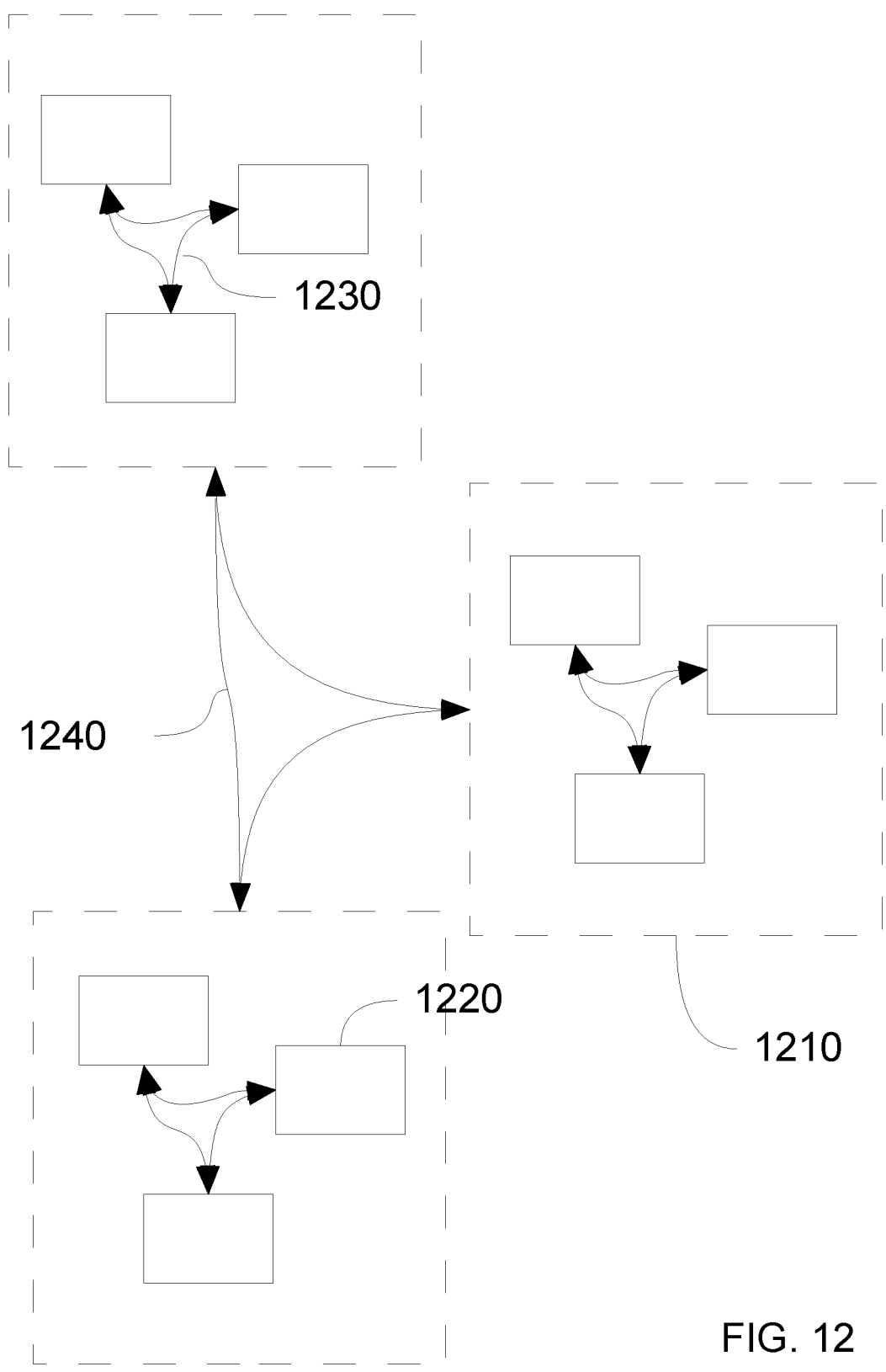
FIG. 12 is a drawing of an example of several shards that are associated with each other.

FIG. 12 is a drawing of an example of several shards. The dotted lines 1210 depict a set of nodes that are processing a common shard. The nodes 1220 depict the individual nodes that are processing a common shard. The arrows 1230 depict that the individual nodes that are processing a common shard product and validate blocks for their common shard. The arrows 1240 depict that the shards communicate their individual PoW hash values to the other blockchains as part of the D-PoW protocol depicted in FIGS. 6 and 7.

Figure 13:
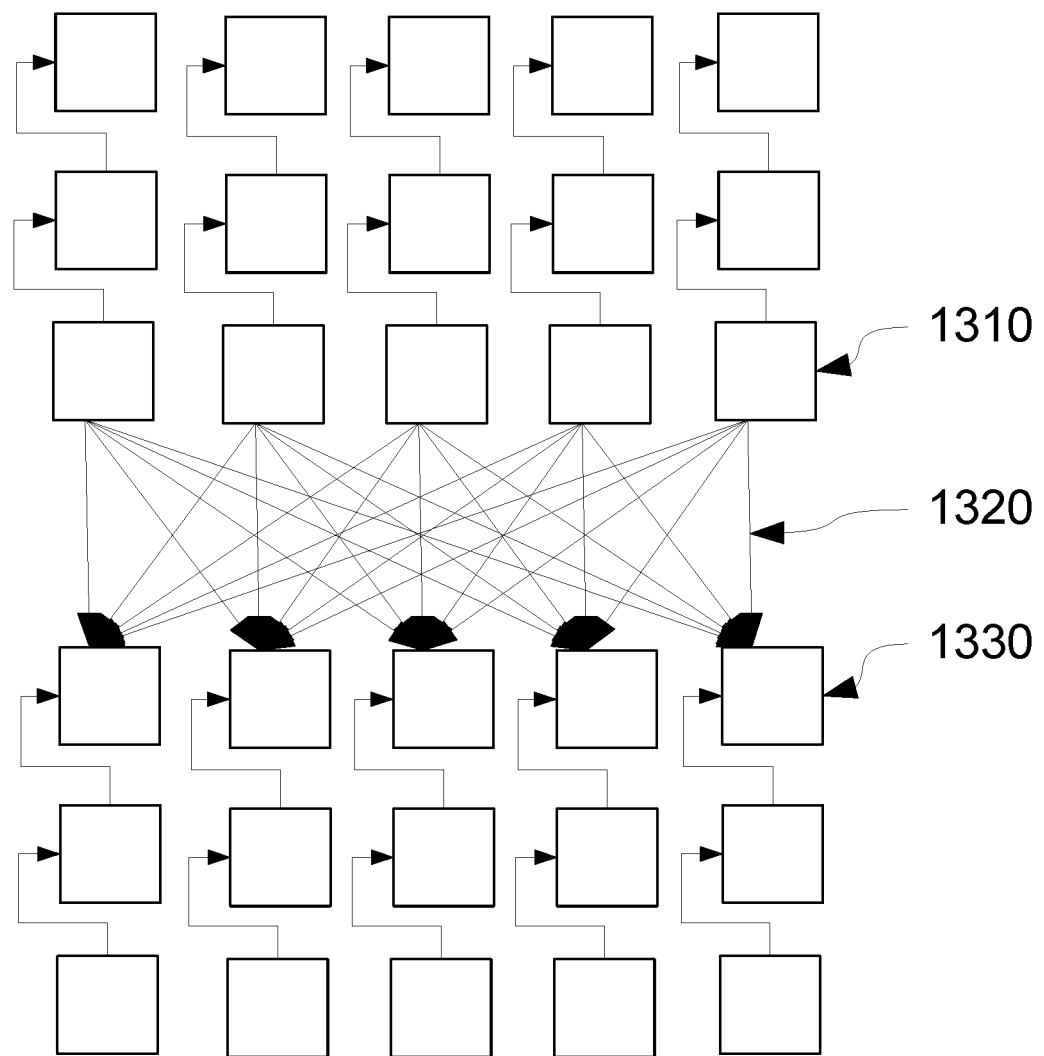
FIG. 13 is a drawing of the relationship of several shards shared PoWs after the D-PoW distribution and collection procedure has completed.

FIG. 13 is a drawing of the relationship of the shard shared PoWs after the D-PoW distribution and collection procedure has completed. The PoW of a recent block 1310 on each shard is shared to all other shards or blockchains depicted by arrows 1320, and further included in all of the shard's subsequent blocks 1330.

Figure 14:
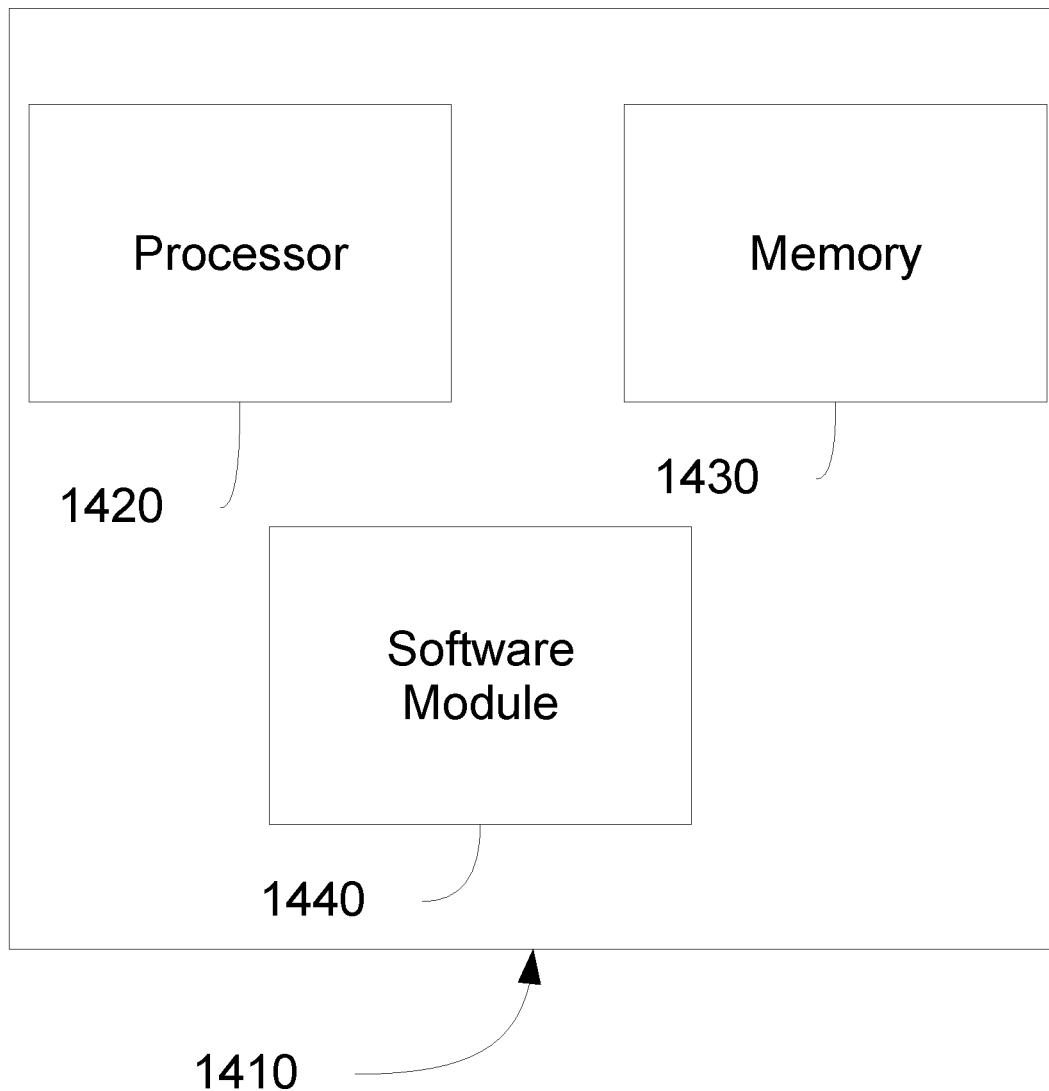
FIG. 14 is a drawing of a networked node entity.

FIG. 14 is a drawing of a networked node entity 1410 comprising: a memory 1430; a processor 1420 and a software module 1440 containing a D-PoW protocol implementation. Processor 1420 and memory 1430 may be discrete components of the network node entity 1410 that are used to execute an application or set of operations to implement a D-PoW protocol implementation as described herein. The application may be coded in software in a computer language understood by the processor 1420, and stored in a computer readable medium, such as, a memory 1430. The computer readable medium may be a non-transitory computer readable medium that includes tangible hardware components, such as memory, that can store software. Furthermore, a software module 1440 may be another discrete entity that is part of the network node entity 1410, and which contains software instructions that may be executed by the processor 1420 to effectuate one or more of the functions described herein. In addition to the above noted components of the network node entity 1410, the network node entity 1410 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the information sent or received by any of the modules may be sent or received directly and/or via one or more of the other modules.

One having ordinary skill in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these embodiments, it would be apparent to those of skill in the art that certain modifications, variations, and alternative constructions would be apparent.

While embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system comprising:
a plurality of shards on a plurality of nodes, said plurality of shards storing and implementing computer-readable instructions for:
generating hash values for a block for each shard of the plurality of shards;
distributing said hash values and identifiers for each said plurality of shards in a distribution and collection protocol phase, wherein distributing further includes:
generating a distributed protocol packet including a log;
evaluating the plurality of shards in an evaluation protocol phase, wherein evaluating includes at least:
creating maximal disjoint sets of shards with equivalent said hash values;
accumulating a total hashpower of each said disjoint set of shards; and
choosing said disjoint set of shards with maximal accumulated total hashpower.

2. The system of claim 1, wherein distributing said hash values and the identifiers for each said plurality of shards further includes:
generating the log of proof-of-work values; and
modifying at least one shard of the plurality of shards on a blockchain by transmitting the distributed protocol packet to the at least one shard and updating the at least one shard with the proof-of-work values in the log.

3. The system of claim 1, wherein the hash values are generated by a secure hash algorithm.

4. The system of claim 1, wherein said distribution and collection protocol phase comprises exchanging network protocol packets periodically between said plurality of nodes.

5. The system of claim 1, wherein evaluating the plurality of shards in the evaluation protocol phase further includes:
iterating over a combined list of blocks from all said plurality of shards.

6. The system of claim 5, wherein iterating over the combined list of blocks from all said plurality of shards further includes determining whether any blocks have conflicting hash values.

7. The system of claim 1, further comprises collecting the hash values and said identifiers and including in a subsequent block for each shard of the plurality of shards.

8. A computer-implemented method for combining hashpower of a plurality of shards on a plurality of nodes comprising:
generating hash values for a block for each shard of the plurality of shards;
distributing said hash values and identifiers for each said plurality of shards in a distribution and collection protocol phase, wherein distributing further includes:
generating a distributed protocol packet including a log;
evaluating the plurality of shards in an evaluation protocol phase, wherein evaluating includes at least:
creating maximal disjoint sets of shards with equivalent said hash values;
accumulating a total hashpower of each said disjoint set of shards; and
choosing said disjoint set of shards with maximal accumulated total hashpower.

9. The computer-implemented method of claim 8, wherein distributing said hash values and the identifiers for each said plurality of shards further includes:
  generating the log of proof-of-work values; and
  modifying at least one shard of the plurality of shards on a blockchain by transmitting the distributed protocol packet to the at least one shard and updating the at least one shard with the proof-of-work values in the log.

10. The computer-implemented method of claim 8, wherein the hash values are generated by a secure hash algorithm.

11. The computer-implemented method of claim 8, wherein said distribution and collection protocol phase comprises exchanging network protocol packets periodically between said plurality of nodes.

12. The computer-implemented method of claim 8, wherein evaluating the plurality of shards in the evaluation protocol phase further includes:
  iterating over a combined list of blocks from all said plurality of shards.

13. The computer-implemented method of claim 12, wherein iterating over the combined list of blocks from all said plurality of shards further includes determining whether any blocks have conflicting hash values.

14. The computer-implemented method of claim 8, further comprises collecting the hash values and said identifiers and including in a subsequent block for each shard of the plurality of shards.

15. A non-transitory computer readable medium storing instructions for combining hashpower of a plurality of shards on a plurality of nodes, that when executed by one or more processors, cause the one or more processors to implement the instructions for:
  generating hash values for a block for each shard of the plurality of shards;
  distributing said hash values and identifiers for each said plurality of shards in a distribution and collection protocol phase, wherein distributing further includes:
    generating a distributed protocol packet including a log;
  evaluating the plurality of shards in an evaluation protocol phase, wherein evaluating includes at least:
    creating maximal disjoint sets of shards with equivalent said hash values;
    accumulating a total hashpower of each said disjoint set of shards; and
    choosing said disjoint set of shards with maximal accumulated total hashpower.

16. The non-transitory computer readable medium of claim 15, wherein distributing said hash values and the identifiers for each said plurality of shards further includes:
  generating the log of proof-of-work values; and
  modifying at least one shard of the plurality of shards on a blockchain by transmitting the distributed protocol packet to the at least one shard and updating the at least one shard with the proof-of-work values in the log.

17. The non-transitory computer readable medium of claim 15, wherein the hash values are generated by a secure hash algorithm.

18. The non-transitory computer readable medium of claim 15, wherein said distribution and collection protocol phase comprises exchanging network protocol packets periodically between said plurality of nodes.

19. The non-transitory computer readable medium of claim 15, wherein evaluating the plurality of shards in the evaluation protocol phase further includes:
  iterating over a combined list of blocks from all said plurality of shards.

20. The non-transitory computer readable medium of claim 19, wherein iterating over the combined list of blocks from all said plurality of shards further includes determining whether any blocks have conflicting hash values.

* * * * *